UNITED STATES PATENT OFFICE.

HARRY J. DUFFEY, OF MIDDLEBURG, VIRGINIA.

PAINT.

No Drawing.   Application filed July 3, 1924.   Serial No. 724,101.

*To all whom it may concern:*

Be it known that I, HARRY J. DUFFEY, a citizen of the United States, residing at Middleburg, in the county of Loudoun and State of Virginia, have invented certain new and useful Improvements in Paints; and I hereby declare that the following is a full, clear, and exact description thereof.

This invention relates to paints, varnishes and the like, and the principal object thereof is to provide a novel, inexpensive, and efficient vehicle for paint preparations which vehicle may be readily obtained in desired quantities, and may be used in place of, and in the same proportions as, linseed oil, in mixing in said paints.

I will explain the invention to enable others to adopt and use the same, and summarize in the claims the invention for which protection is desired.

I have found that waste lubricating oil such as is drained from the crank cases of internal combustion engines of automobiles and the like, contains certain qualities and characteristics which enable such ordinarily waste product to be used in place of linseed oil in the preparation of paint and the like, such waste lubricating oil forming an inexpensive and efficient vehicle for paints.

Such waste lubricating oil, or so called "gyp" oil, has been and is yet generally considered a nuisance and annoyance; and has usually been thrown away when drained from the crank cases of internal combustion engines and thus wholly wasted. Such waste oil could be obtained from garages and service stations, filling stations, and the like, at a very low cost.

In preparing paints, the pigment, vehicle, and filler may be mixed with such waste oil in substantially the same proportions of ingredients as are used in peparing paints with linseed oil, and the proportions may be varied to suit particular requirements as with linseed oil.

The waste lubricating oil may be used for such purposes in the condition in which it is drawn from the crank cases. The several mechanical actions such as beating, stirring, and rubbing, to which the oil is subjected in the crank cases and by which its lubricating properties are impaired, in my opinion so change the physical or chemical or both physical and chemical structures of the lubricating oil as to render it highly serviceable for use in paints in place of linseed and like expensive oils heretofore used.

Paints made with such waste oil in place of linseed oil are particularly well suited for use in painting metal and wood, and where a heavy paint is desired; and are very durable and weather resisting.

Paints made by using such waste oil are less expensive than linseed oil paints, and may be used in place thereof, said oil being mixed with the other paint ingredients in substantially the same proportions as linseed oil would be used.

I claim:

1. A paint comprising a suitable filler, and waste used lubricating oil such as obtained from engine crank cases.

2. A paint comprising a filler, and waste used lubricating oil from the crank cases of engines, said waste oil being used in place of linseed-oil.

In testimony that I claim the foregoing as my own, I affix my signature.

HARRY J. DUFFEY.